(12) United States Patent

Kuciniek, Jr.

(10) Patent No.: US 12,605,978 B1

(45) Date of Patent: Apr. 21, 2026

(54) FLYING CAR WITH MULTIPLE WHEELS

(71) Applicant: Taras Kuciniek, Jr., Santa Paula, CA (US)

(72) Inventor: Taras Kuciniek, Jr., Santa Paula, CA (US)

( * ) Notice: Subject to any disclaimer, the term of this patent is extended or adjusted under 35 U.S.C. 154(b) by 0 days.

(21) Appl. No.: 18/919,747

(22) Filed: Oct. 18, 2024

(51) Int. Cl.
　　B60F 5/02 (2006.01)
　　B64C 37/00 (2006.01)

(52) U.S. Cl.
　　CPC ............... B60F 5/02 (2013.01); B64C 37/00 (2013.01)

(58) Field of Classification Search
　　CPC .......... B60F 5/02; B60F 3/007; B60G 21/007; B60G 2300/122; B64C 29/0033; B64C 37/00; B64C 29/0025; B64C 29/0075; B64C 39/024; B64C 27/20; B64C 2201/027; B64C 2201/108; B64C 3/56; B64D 5/00; B64D 27/20
　　See application file for complete search history.

(56) References Cited

U.S. PATENT DOCUMENTS

| | | | | |
|---|---|---|---|---|
| 1,481,400 | A | * | 1/1924 | Weinberg .................. B64C 3/56 |
| | | | | 244/49 |
| 1,718,577 | A | * | 6/1929 | Pitcairn ................. B64C 27/473 |
| | | | | 416/88 |
| 1,731,737 | A | * | 10/1929 | Cumming ................. B60L 5/06 |
| | | | | 191/63.1 |
| 1,761,053 | A | * | 6/1930 | Rystedt ................. B64C 39/008 |
| | | | | 280/832 |
| 1,998,148 | A | * | 4/1935 | Vieriu ....................... B64C 3/56 |
| | | | | 244/49 |
| 2,011,254 | A | * | 8/1935 | Nightingale .............. B64C 3/56 |
| | | | | 74/504 |
| 2,215,003 | A | * | 9/1940 | Johnson .................. B64C 37/00 |
| | | | | 244/234 |
| 2,241,577 | A | * | 5/1941 | Beals, Jr. ............... B64C 37/00 |
| | | | | 244/50 |

(Continued)

*Primary Examiner* — Medhat Badawi

(74) *Attorney, Agent, or Firm* — Sandy Lipkin

(57) ABSTRACT

A flying vehicle with folding wings that drives well on the ground and flies well in the air; controlled from inside, it changes from automotive to aircraft configuration without the operator needing to get out of the vehicle. The balance point of the vehicle is located midway between the front and back wheels, providing good handling on the road. In the aircraft configuration with wings unfolded, there is a front wing and a back wing. The incidence of the front wing is controllable, enabling the craft to rotate and take off with a center of gravity located well ahead of the rear wheels. The back wing is fitted with foldable vertical stabilizers near its wing tips. In automobile configuration the wings are folded on top of the body; the wings resemble a roof rack with large surfboards on it. Driven wheels provide motive power on the ground; ducted fans provide thrust for air travel. An autopilot system provides stability and navigation aid, particularly in bad weather or poor visibility. In the roadable configuration, filling water ballast tanks provides additional crosswind stability and crash protection. Also in a roadable configuration, the present invention may be licensed as a three-wheeled motorcycle towing a two-wheeled trailer. In its flying configuration, the invention can be licensed as a Light Sport Aircraft.

13 Claims, 7 Drawing Sheets

(56)                 References Cited

U.S. PATENT DOCUMENTS

| 2,402,468 | A | * | 6/1946 | Thompson | B64C 37/00 |
| | | | | | 244/49 |
| 2,423,095 | A | * | 7/1947 | Gibson | B64C 3/54 |
| | | | | | 244/218 |
| 2,430,869 | A | * | 11/1947 | Fulton, Jr. | B64C 37/00 |
| | | | | | 244/233 |
| 2,468,425 | A | * | 4/1949 | Carpenter | B64C 3/56 |
| | | | | | 244/49 |
| 2,494,547 | A | * | 1/1950 | Fish, Jr. | B64C 37/00 |
| | | | | | 315/83 |
| 2,562,490 | A | * | 7/1951 | Hall | B64C 37/00 |
| | | | | | 244/118.2 |
| 2,562,491 | A | * | 7/1951 | Hall | B64C 37/00 |
| | | | | | 244/50 |
| 2,563,731 | A | * | 8/1951 | Masterson | B64C 37/00 |
| | | | | | 244/2 |
| 2,572,421 | A | * | 10/1951 | Abel, Jr. | B64C 3/56 |
| | | | | | 244/49 |
| 2,573,271 | A | * | 10/1951 | Perl | B64C 37/00 |
| | | | | | 244/49 |
| 2,666,602 | A | * | 1/1954 | Holland | B64C 3/56 |
| | | | | | 244/49 |
| 2,674,422 | A | * | 4/1954 | Pellarini | B64C 3/56 |
| | | | | | 244/49 |
| 2,675,976 | A | * | 4/1954 | Gerardine | B64C 37/00 |
| | | | | | 244/109 |
| 2,692,095 | A | * | 10/1954 | Carpenter | B64C 37/00 |
| | | | | | 244/50 |
| 2,713,393 | A | * | 7/1955 | Isacco | B64C 27/46 |
| | | | | | 416/88 |
| 2,767,939 | A | * | 10/1956 | Taylor | B60F 5/02 |
| | | | | | 244/49 |
| 2,811,323 | A | * | 10/1957 | Rethorst | B64C 37/00 |
| | | | | | 244/49 |
| 2,864,567 | A | * | 12/1958 | Kissinger | B64C 39/06 |
| | | | | | 244/36 |
| 2,940,688 | A | * | 6/1960 | Bland | B60F 5/02 |
| | | | | | 114/102.16 |
| 3,056,564 | A | * | 10/1962 | Zuck | B64C 37/00 |
| | | | | | D12/4 |
| 3,065,927 | A | * | 11/1962 | Mills | B64C 37/00 |
| | | | | | 244/2 |
| 3,065,938 | A | * | 11/1962 | Calkins | B64C 37/00 |
| | | | | | 416/142 |
| 3,090,581 | A | * | 5/1963 | Einarsson | B64C 37/00 |
| | | | | | 244/48 |
| 3,134,560 | A | * | 5/1964 | Halsmer | B64C 37/00 |
| | | | | | 244/49 |
| 3,138,351 | A | * | 6/1964 | Zuck | B64C 3/56 |
| | | | | | 244/49 |
| 3,162,401 | A | * | 12/1964 | Hopwood | B64C 23/005 |
| | | | | | 416/4 |
| 3,317,161 | A | * | 5/1967 | Sawyer | B64C 37/00 |
| | | | | | 244/36 |
| 3,494,575 | A | * | 2/1970 | Budworth | B64C 37/00 |
| | | | | | 244/7 R |
| 3,612,440 | A | * | 10/1971 | Strong | B64C 37/00 |
| | | | | | 244/2 |
| 4,043,421 | A | * | 8/1977 | Smith | B64C 27/20 |
| | | | | | 180/117 |
| 4,117,900 | A | * | 10/1978 | Amick | B60L 8/006 |
| | | | | | 296/180.5 |
| 4,269,374 | A | * | 5/1981 | Miller | B64C 37/00 |
| | | | | | 244/49 |
| 4,566,717 | A | * | 1/1986 | Arthur | B60G 15/06 |
| | | | | | 280/789 |
| 4,579,297 | A | * | 4/1986 | Ayoola | B60F 3/00 |
| | | | | | 244/50 |
| 4,627,585 | A | * | 12/1986 | Einstein | B60F 5/02 |
| | | | | | 244/49 |
| 4,685,410 | A | * | 8/1987 | Fuller | B63H 9/061 |
| | | | | | D12/303 |
| 4,824,053 | A | * | 4/1989 | Sarh | B23Q 1/601 |
| | | | | | 244/49 |
| 4,856,732 | A | * | 8/1989 | Eickmann | B64D 35/00 |
| | | | | | 244/66 |
| 4,913,375 | A | * | 4/1990 | Fitzpatrick | B64C 37/00 |
| | | | | | 440/37 |
| 5,050,817 | A | * | 9/1991 | Miller | B60F 5/02 |
| | | | | | 244/50 |
| 5,100,357 | A | * | 3/1992 | MacCready | A63H 27/00 |
| | | | | | 446/61 |
| 5,141,173 | A | * | 8/1992 | Lay | B60K 7/0007 |
| | | | | | 180/2.2 |
| D331,893 | S | * | 12/1992 | Szakacs | D12/333 |
| 5,203,520 | A | * | 4/1993 | Przygodzki | B64C 37/00 |
| | | | | | 244/17.19 |
| 5,232,005 | A | * | 8/1993 | Mitchell | A01D 34/81 |
| | | | | | 224/571 |
| 5,232,135 | A | * | 8/1993 | Marren | B60R 9/06 |
| | | | | | 224/520 |
| 5,244,133 | A | * | 9/1993 | Abbott | B60R 9/10 |
| | | | | | 224/532 |
| D340,426 | S | * | 10/1993 | Miller | D12/4 |
| 5,310,100 | A | * | 5/1994 | Liscinsky | B60R 9/065 |
| | | | | | 224/527 |
| 5,360,367 | A | * | 11/1994 | Ho | A63H 17/26 |
| | | | | | 446/470 |
| 5,433,357 | A | * | 7/1995 | Alliff | B60R 9/06 |
| | | | | | 224/510 |
| 5,435,502 | A | * | 7/1995 | Wernicke | B64C 39/10 |
| | | | | | 244/45 R |
| 5,465,883 | A | * | 11/1995 | Woodward | B60R 9/06 |
| | | | | | 224/558 |
| 5,505,407 | A | * | 4/1996 | chiappetta | B60F 5/02 |
| | | | | | 244/50 |
| 5,645,250 | A | * | 7/1997 | Gevers | B64D 35/04 |
| | | | | | 244/50 |
| 5,810,638 | A | * | 9/1998 | Wood | A63H 11/10 |
| | | | | | 446/470 |
| 5,890,441 | A | * | 4/1999 | Swinson | B64U 10/13 |
| | | | | | 244/12.3 |
| 5,915,649 | A | * | 6/1999 | Head | B64C 37/00 |
| | | | | | 244/17.17 |
| 5,984,228 | A | * | 11/1999 | Pham | B64C 37/00 |
| | | | | | 244/49 |
| 6,082,665 | A | * | 7/2000 | Spitzer | B64C 37/00 |
| | | | | | 246/221 |
| 6,086,014 | A | * | 7/2000 | Bragg, Jr. | B60F 5/02 |
| | | | | | 244/49 |
| 6,129,306 | A | * | 10/2000 | Pham | B64C 37/00 |
| | | | | | 244/50 |
| 6,131,848 | A | * | 10/2000 | Crow | B64C 37/00 |
| | | | | | 244/50 |
| 6,138,943 | A | * | 10/2000 | Huang | B60F 5/02 |
| | | | | | 244/93 |
| 6,517,026 | B1 | * | 2/2003 | Smith | B64C 37/00 |
| | | | | | 244/50 |
| 6,619,584 | B1 | * | 9/2003 | Haynes | B64C 5/12 |
| | | | | | 244/50 |
| 6,786,450 | B1 | * | 9/2004 | Einstein | B64C 3/56 |
| | | | | | 244/45 R |
| 6,824,095 | B2 | * | 11/2004 | Mao | B64C 29/0025 |
| | | | | | 244/12.5 |
| 6,834,835 | B1 | * | 12/2004 | Knowles | B64C 3/54 |
| | | | | | 244/46 |
| 6,860,449 | B1 | * | 3/2005 | Chen | B64B 1/32 |
| | | | | | 244/12.6 |
| 6,877,690 | B1 | * | 4/2005 | Bragg | B64C 37/00 |
| | | | | | 244/219 |
| 6,880,880 | B1 | * | 4/2005 | Armstrong | B62K 27/003 |
| | | | | | 296/183.1 |
| 6,978,970 | B2 | * | 12/2005 | Purcell, Jr. | B64C 5/06 |
| | | | | | 244/49 |
| 7,300,019 | B2 | * | 11/2007 | Preston | B60F 5/02 |
| | | | | | 244/2 |
| 7,410,122 | B2 | * | 8/2008 | Robbins | B64U 10/20 |
| | | | | | 244/12.3 |

(56) References Cited

U.S. PATENT DOCUMENTS

| | | | | |
|---|---|---|---|---|
| 7,445,070 B1* | 11/2008 | Pickering | B62D 61/08 | 180/215 |
| 7,762,500 B1* | 7/2010 | Dhall | B64C 37/00 | 244/45 R |
| 7,789,343 B2* | 9/2010 | Sarh | B64C 3/54 | 244/46 |
| 7,832,690 B1* | 11/2010 | Levine | B64C 3/54 | 244/218 |
| 7,866,610 B2* | 1/2011 | Bousfield | B64U 30/12 | 244/46 |
| 7,874,512 B2* | 1/2011 | Xu | B64C 37/00 | 244/49 |
| 7,931,230 B2* | 4/2011 | Bakker | B64C 37/00 | 244/17.11 |
| 7,938,358 B2* | 5/2011 | Dietrich | B60F 5/02 | 244/49 |
| 7,959,104 B2* | 6/2011 | Kuntz | A63H 27/12 | 244/50 |
| 8,210,473 B2* | 7/2012 | Schweighart | B60F 5/02 | 244/99.2 |
| 8,220,755 B2* | 7/2012 | Sharp | B64C 9/02 | 244/89 |
| 8,267,347 B2* | 9/2012 | Goldshteyn | B64C 37/00 | 244/49 |
| 8,371,520 B2* | 2/2013 | Easter | B64C 25/405 | 244/49 |
| 8,453,962 B2* | 6/2013 | Shaw | B64U 10/60 | 244/17.23 |
| 8,464,979 B2* | 6/2013 | Im | B64C 37/00 | 244/45 R |
| 8,528,852 B2* | 9/2013 | Farrag | B64C 37/00 | 244/50 |
| 8,833,692 B2* | 9/2014 | Yoeli | B64C 29/0025 | 244/23 A |
| 9,096,179 B2* | 8/2015 | Reiseder | B60R 9/06 | |
| 9,156,550 B2* | 10/2015 | Nam | B64C 3/00 | |
| 9,259,984 B2* | 2/2016 | Brown | B64C 39/04 | |
| 9,493,235 B2* | 11/2016 | Zhou | G05D 1/048 | |
| 9,505,282 B2* | 11/2016 | Hu | B63B 5/24 | |
| 9,533,624 B2* | 1/2017 | Cha | B60R 19/023 | |
| 9,550,444 B1* | 1/2017 | Ferreira | B60P 3/077 | |
| 9,868,485 B2* | 1/2018 | McPheeters | B62J 7/00 | |
| 10,081,424 B2* | 9/2018 | Radu | B64C 29/0033 | |
| 10,124,880 B1* | 11/2018 | Ellzey | B64U 40/10 | |
| 10,220,686 B2* | 3/2019 | Baccouche | B60J 5/0479 | |
| 10,518,595 B2* | 12/2019 | Dietrich | B64C 11/001 | |
| 11,027,584 B1* | 6/2021 | Kiceniuk, Jr. | B60F 5/02 | |
| 11,117,658 B2* | 9/2021 | Neff | B64C 27/08 | |
| 11,230,363 B2* | 1/2022 | Klein | B64C 35/008 | |
| 11,530,038 B2* | 12/2022 | Wang | B64U 10/14 | |
| 11,571,938 B2* | 2/2023 | Zhou | B64D 25/10 | |
| 11,738,864 B2* | 8/2023 | Chando | B64C 27/605 | 244/7 A |
| 11,738,865 B1* | 8/2023 | Kempshall | B64C 27/28 | 244/171.3 |
| 12,122,203 B1* | 10/2024 | Kuciniek, Jr. | B60G 21/007 | |
| 2002/0139894 A1* | 10/2002 | Sorensen | B64C 39/066 | 244/2 |
| 2003/0094536 A1* | 5/2003 | LaBiche | B64C 37/00 | 244/2 |
| 2003/0094537 A1* | 5/2003 | Austen-Brown | B64C 27/28 | 244/7 R |
| 2004/0100045 A1* | 5/2004 | Amacker | B60R 9/06 | 280/30 |
| 2004/0104303 A1* | 6/2004 | Mao | B64C 37/00 | 244/12.5 |
| 2004/0178649 A1* | 9/2004 | Agan | B60P 3/14 | 296/26.08 |
| 2006/0016930 A1* | 1/2006 | Pak | B64C 29/0033 | 244/12.4 |
| 2008/0191447 A1* | 8/2008 | Nowakowski | B62K 5/00 | 280/282 |
| 2008/0251308 A1* | 10/2008 | Molnar | B64C 27/02 | 180/209 |
| 2010/0059302 A1* | 3/2010 | Barns | B62K 13/00 | 180/209 |
| 2010/0181414 A1* | 7/2010 | Lopez, Jr. | B64C 29/0033 | 244/12.4 |
| 2010/0294877 A1* | 11/2010 | Jianu | B60F 5/02 | 74/551.1 |
| 2011/0000254 A1* | 1/2011 | Lee | F28F 21/084 | 62/498 |
| 2011/0036655 A1* | 2/2011 | Ackley | B62K 5/027 | 180/215 |
| 2011/0036938 A1* | 2/2011 | Blomeley | B64C 39/04 | 244/65 |
| 2011/0042507 A1* | 2/2011 | Seiford, Sr. | B64C 29/0025 | 244/2 |
| 2011/0163197 A1* | 7/2011 | Farrag | B64C 37/00 | 244/2 |
| 2011/0168834 A1* | 7/2011 | Yoeli | B64C 1/22 | 244/12.3 |
| 2011/0192931 A1* | 8/2011 | Jung | B60F 5/02 | 244/2 |
| 2011/0284683 A1* | 11/2011 | Liu | B64C 1/00 | 244/12.3 |
| 2011/0315806 A1* | 12/2011 | Piasecki | B64U 50/11 | 244/17.11 |
| 2012/0032023 A1* | 2/2012 | Bousfield | B64C 5/12 | 244/49 |
| 2012/0048989 A1* | 3/2012 | Eames | B60F 5/02 | 244/2 |
| 2013/0068876 A1* | 3/2013 | Radu | B60F 5/02 | 244/2 |
| 2013/0112804 A1* | 5/2013 | Zhu | B64C 3/56 | 244/2 |
| 2013/0126666 A1* | 5/2013 | Brown | B64C 39/04 | 244/2 |
| 2013/0193263 A1* | 8/2013 | Schweighart | B64C 3/56 | 244/49 |
| 2013/0206919 A1* | 8/2013 | Shachor | B64U 10/60 | 244/23 A |
| 2014/0004761 A1* | 1/2014 | Neprud | B60F 3/0069 | 440/12.5 |
| 2015/0006021 A1* | 1/2015 | D'Arbonneau | G01P 5/16 | 701/30.2 |
| 2015/0102155 A1* | 4/2015 | Krastev | B60K 16/00 | 244/2 |
| 2017/0328345 A1* | 11/2017 | Grober | G01P 5/00 | |
| 2018/0127104 A1* | 5/2018 | Kobayashi | B64D 27/351 | |
| 2019/0300170 A1* | 10/2019 | Bousfield | B64C 37/00 | |

* cited by examiner

} 500

410

420

310,505

505 {

410

323

410

410   410

400 {

FLYING CAR WITH MULTIPLE WHEELS

REFERENCE TO PRIOR APPLICATION

This application is a continuation of application Ser. No. 17/235,059, filed Apr. 20, 2021, which was a continuation-in-part of application Ser. No. 14/56,026, filed Feb. 3, 2021 which claimed priority to provisional application entitled, "Flying Car with Fore and Aft Lifting Surfaces" filed Oct. 17, 2014 by Taras Kiceniuk, Jr.

BACKGROUND OF THE INVENTION

Field of the Invention

The present invention provides novel improved apparatus and method to the field of flying cars and roadable aircraft. For over a century people have dreamed of a vehicle that was both a good car and a good aircraft. Many attempts have been made to realize this dream: in 1917 aviation pioneer Glenn Curtiss' Company built the Autoplane, which achieved short flight hops. In 1933 Waldo Waterman flew the first successful roadable aircraft called the "Arrowbile". In 1947 the Convair Company built an experimental flying car with a detachable wing structure. Molt Taylor completed the "Aerocar" in 1949, which had detachable wings and tail assembly that could be towed as a trailer behind the car module; several production units were built and some still fly today. Converting the "Aerocar" from car to plane or back again required about 40 minutes of work. The Terrafugia Transition is a roadable aircraft that has been under development since 2006; it changes configuration autonomously as directed by the operator. Attempts have been made to build vertical take off (VTOL) flying cars, but the power required to take off and the windblast produced are both daunting.

Description of the Prior Art

Below is a listing, with some comments, of various patents in the prior art related to flying cars and to the present invention:

In 1924 Weinberg, U.S. Pat. No. 1,481,400 teaches a folding wing mechanism where the wings fold back and pivot to a vertical plane; the wing struts are used to secure the wings to the aft fuselage.

In 1929 Tubbe, U.S. Pat. No. 1,731,757 discloses a pusher configuration aircraft with wings that fold downward at a distance from the fuselage while the tail boom folds upward, and alternately a wing that pivots about a vertical axis, one tip going forward the other tip moving aft. Tubbe also teaches a wheel retraction mechanism.

In 1930 Rystedt, U.S. Pat. No. 1,761,053 shows an aircraft with multiple ducted fans and retractable wheels. In 1935 Vieriu, U.S. Pat. No. 1,998,148 shows wings that pivot rearwards about a vertical axis, the pivots being located near the three-quarter chord position on the wing.

In 1935 Nightingale, U.S. Pat. No. 2,011,254 teaches wings that pivot aft about vertical axes and trailing edge control surfaces that fold downward when the wings fold back. In 1940 Johnson, U.S. Pat. No. 2,215,003 shows a flying automobile with detachable wing and tail structure.

In 1941 Beals, U.S. Pat. No. 2,241,577 depicts a pusher configuration flying car with detachable wing and tail unit.

In 1946 Thompson, U.S. Pat. No. 2,402,468 shows a four-wheeled aircraft with two-axis-pivot aft folding wings.

In 1947 Fulton, U.S. Pat. No. 2,430,869 teaches a four-wheel car with detachable wing and tail structure.

In 1950 Fish, U.S. Pat. No. 2,494,547 teaches a detachable wing and tail structure attaching beneath the car portion of the vehicle.

IN 1951 Hall, U.S. Pat. No. 2,562,490 shows a flying car with detachable wing and tail.

In 1951 Masterson, U.S. Pat. No. 2,563,731 teaches a flying car with a foldable helicopter-type rotor.

In 1951 Abel, U.S. Pat. No. 2,572,421 shows a folding wing aircraft with two-axis pivots.

In 1951 Perl, U.S. Pat. No. 2,573,271 teaches forward folding wings and retracting tail boom, which move the center of gravity of the vehicle forward when in roadable configuration. The wings are stacked one above the other when folded.

In 1954 Holland, U.S. Pat. No. 2,666,602 teaches aft folding wings that overlap when folded.

In 1954 Pellarini, U.S. Pat. No. 2,674,422 shows multi-axis aft folding wings on a roadable aircraft.

Also in 1954 Gerardine, U.S. Pat. No. 2,675,976 provides improved means of detaching the wing and tail assembly of a roadable aircraft.

And again in 1954 Carpenter, U.S. Pat. No. 2,692,095 teaches aft folding wings that overlap when folded.

In 1957 Rethorst, U.S. Pat. No. 2,811,323 describes a low aspect ration roadable aircraft with retractable stub wings.

In 1958 Kissinger, U.S. Pat. No. 2,864,567 shows a craft with a circular plan form wing that has inward folding tip sections.

In 1960 Bland, U.S. Pat. No. 2,940,688 teaches a roadable aircraft with folding wings that also functions as a sailboat.

IN 1962 Zuck, U.S. Pat. No. 3,056,564 shows aft folding wings that overlap when folded.

In 1964 Halsmer, U.S. Pat. No. 3,134,560 depicts a folding wing roadable aircraft that can rotate the aircraft portion to an angle of incidence relative to a four-wheel under carriage.

In 1967 Sawyer, U.S. Pat. No. 3,317,161 shows two ducted fans embedded in the body of an air car that blow air over a series of lifting airfoils.

In 1977 Smith, U.S. Pat. No. 4,043,421 teaches a quad-rotor air car with four vertical axis fans.

In 1986 Einstein, U.S. Pat. No. 4,627,585 reveals an auto-plane with wings that fold asymmetrically along four longitudinal axes and stack up on top of the vehicle, the tail assembly retracts forward.

In 1991 Miller, U.S. Pat. No. 5,050,817 teaches a Combined Road and Aircraft Vehicle that employs aft multi-axis folding wings and a retracting tail assembly.

In 1992 Lay, U.S. Pat. No. 5,141,173 reveals a Pressure Jet and Ducted Fan Hybrid Electric car, with optional solar panels.

In 1995 Wernicke, U.S. Pat. No. 5,435,502 shows a short span Flying and Road Vehicle with upper and lower tip-mounted winglets.

In 1996 Chiappetta, U.S. Pat. No. 5,505,407 teaches an Air-Land Vehicle with multiple shrouded fans.

In 1999 Pham, U.S. Pat. No. 5,984,228 discloses a Rapidly-Convertible Roadable Aircraft with a wing that pivots as a unit about a single vertical axis. A rear-mounted ducted fan is shown.

In 2000 Spitzer, U.S. Pat. No. 6,082,665 reveals a Roadable Aircraft with wings that fold to vertical forward-located positions along the sides of the vehicle.

In 2000 Bragg, U.S. Pat. No. 6,086,014 teaches compound-folding wings that stow in vertical orientation on the sides of the vehicle.

In 2000 Pham, U.S. Pat. No. 6,129,306 shows a roadable aircraft with a wing that pivots as a unit about a single vertical axis and additionally has inward folding tip sections.

In 200 Crow, U.S. Pat. No. 6,131,848 shows wings folding to side mounted vertical positions with horizontally folding portions that enhance occupant visibility.

In 2003 Haynes, U.S. Pat. No. 6,619,584 B1 discloses wings that fold along a plurality of longitudinal axes.

In 2004 Einstein, U.S. Pat. No. 6,786,450 B1 teaches asymmetrical fore and aft pivoting wing tip sections moving in a horizontal plane, detachable front lifting surfaces are also disclosed.

In 2005 Bragg, U.S. Pat. No. 6,877,690 B1 reveals a motorcycle with a parasail wing.

In 2005 Purcell, U.S. Pat. No. 6,978,970 B2 discloses aft-folding wings with flexible inner portions and also a folding tail assembly.

In 2007 Preston, U.S. Pat. No. 7,300,019 B2 shows a ground vehicle with a flexible parasail attached above.

In 2011 Xu, U.S. Pat. No. 7,874,512 B2 reveals a collapsible biplane configuration the wings where additionally pivot as a unit about a single vertical axis.

In 2011 Dietrich et al., U.S. Pat. No. 7,938,358 B2 teach a roadable aircraft with wings that fold inboard, pivoting about four longitudinal axes.

In 2012 Bousfield et al., US application US 212/0032023 A1 disclose a retractable wing hinge and truss for wings that pivot in a horizontal plane.

In 2012 Seiford, U.S. Pat. No. 8,162,253 B2 show aft-folding wings that stow in a vertical position.

In 2012 Goldshteyn, U.S. Pat. No. 8,267,347 B2 discloses wing tip sections that fold inboard about longitudinal axes.

In 2013 Easter, U.S. Pat. No. 8,371,520 B2 teaches telescoping wing tips and tail booms, and a low wing unit that pivots about a vertical axis.

In 2013 Eames, U.S. Pat. No. 8,376,263 B2 shows a roadable aircraft in a tandem wing configuration with aft-folding front wing panels and forward-folding rear wing panels, including blown flaps and pivoting ducted fans.

In 2013 Im, U.S. Pat. No. 8,464,979 B2 reveals a Foldable Swan-Wings Aircraft where the wings fold upward at the root section on each side.

In 2013 Schweighart et al., US application US 2013/0193263 A1 show wings that fold about four longitudinal axes, folding up at the root section and downward near the midpoint of each side wing panel.

In 2013 Blomeley, U.S. Pat. No. 8,511,603 B2 teaches aft folding wings with collapsible structure and a ductless fan for propulsion.

Aft-folding wings were used on de Havilland biplane aircraft in the 1920's.

The primary object of the present invention is to provide a vehicle that converts easily from a self-contained roadworthy car configuration into a good flying aircraft configuration and back again while the occupants remain in the vehicle. More specifically, for improved balance, it is an object of the invention to have a center of gravity located substantially midway between the front and rear wheels in the roadable configuration. This is to give good automotive handling.

It is an object of the present invention to have fore and aft lifting surfaces, the front surface having variable lifting ability that enables the craft to rotate for takeoff while having a center of gravity located well forward of the rear wheels.

It is a key object of the invention to have a front surface that can develop a large amount of lift and yet not destabilize the craft in the pitch axis.

It is an object of the invention to have a self-trimming front surface that adjusts its trim condition in response to oncoming airflow meeting the craft when in flying configuration.

It is a further object of the invention to be licensable in its roadable configuration as a three-wheeled motorcycle towing a two-wheeled trailer. A three-wheeled motorcycle and cyclecar are considered legally similar if not identical in various jurisdictions.

SUMMARY OF THE INVENTION

In a preferred embodiment the present invention can have five wheels; two front wheels can be steerable; and at least one wheel can be driven to provide automobility on the ground. In a preferred embodiment a three wheel independently drivable portion can be detachably attached to a two-wheeled trailer module. For ground travel, the invention can be licensed as a three-wheeled motorcycle towing a two-wheeled trailer. For flying, the craft can be licensed as a Light Sport Aircraft. In the flying configuration, a forward and an aft lifting surface can be provided; the front surface can fold rearward and the aft lifting surface can fold towards the front when forming a roadable configuration. When in flying configuration, the front lifting surface can pivot about a lateral axis in response to its relative wind, allowing it to generate large amounts of lift and yet not destabilize the craft in pitch. Combination winglets, vertical stabilizing surfaces, and control surfaces can be provided near the outboard sections of the aft lifting surface. Ducted fans can provide thrust to the craft when in its flying configuration. Keeping empty weight and airspeed within the limits of the FAA Light Sport Aircraft Category can reduce development and production costs.

In an alternative embodiment the current invention may have four wheels, which provides for many of the benefits and limitations of regular automobiles.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1A:
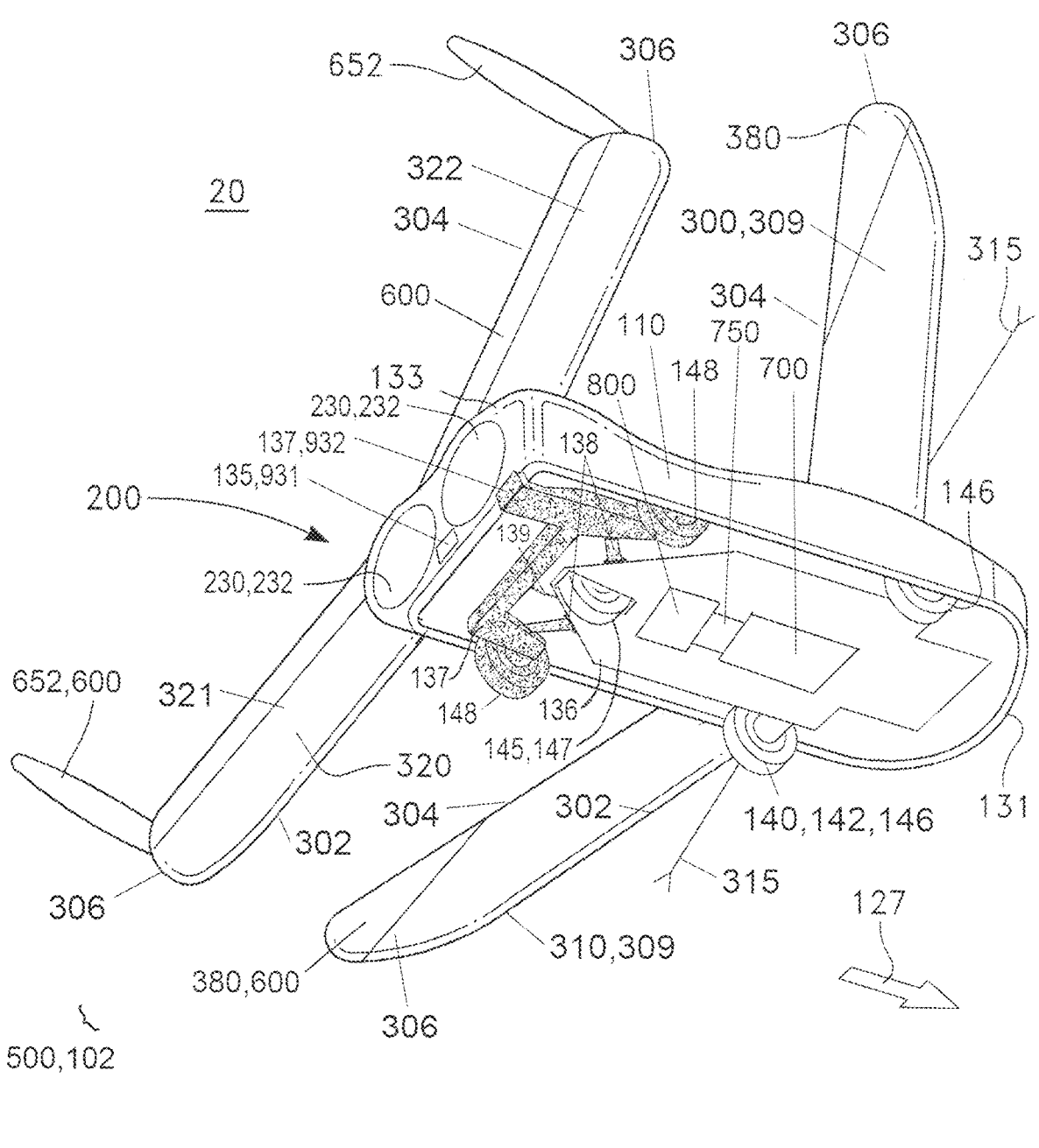
FIG. 1A shows the present invention in flying configuration, the detachably joined portion of the invention 137 is shown shaded for contrast.
Figure 1B:
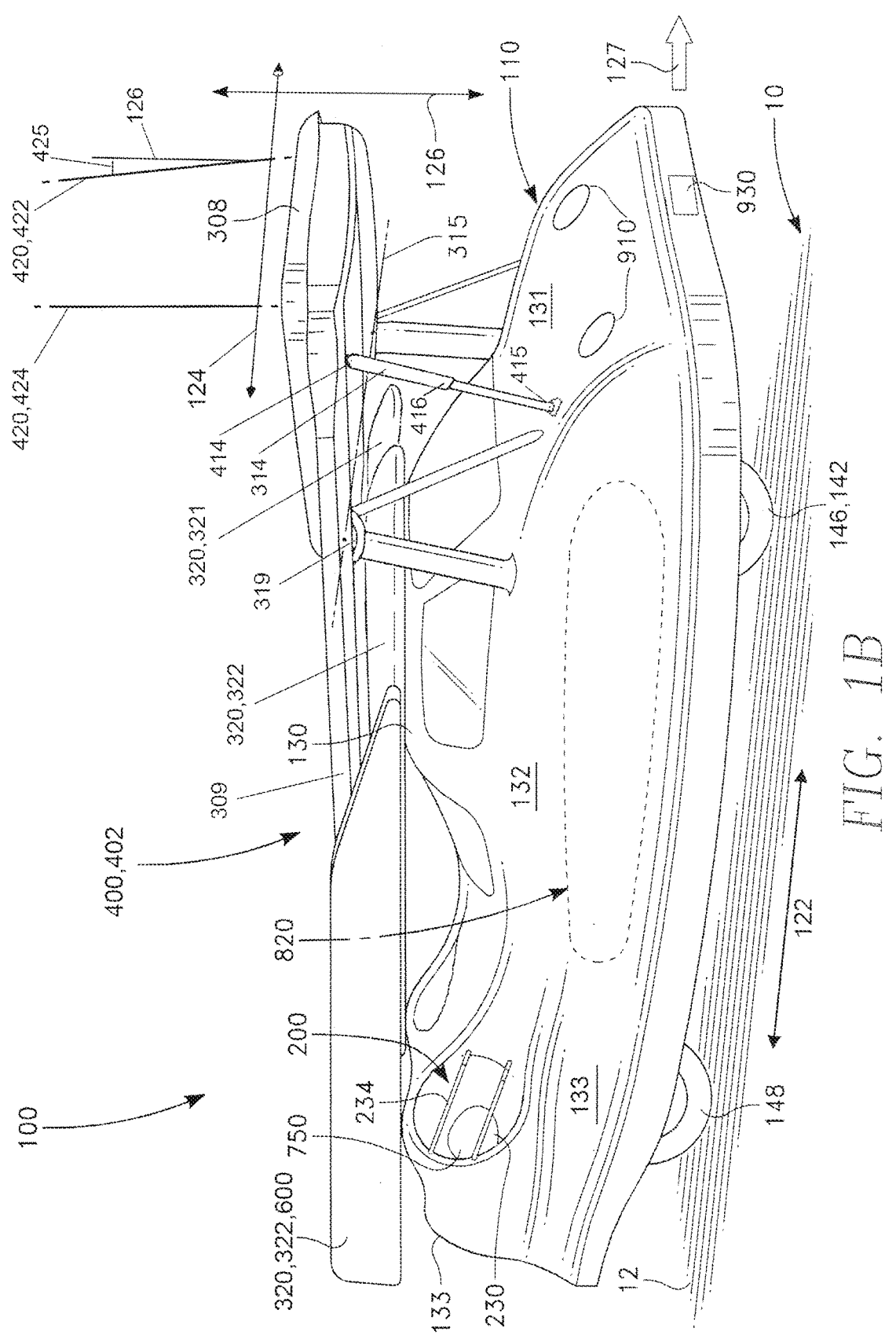
FIG. 1B shows the invention sitting on the ground in roadable configuration.
Figures 2A, 2B, 2C, 2D:
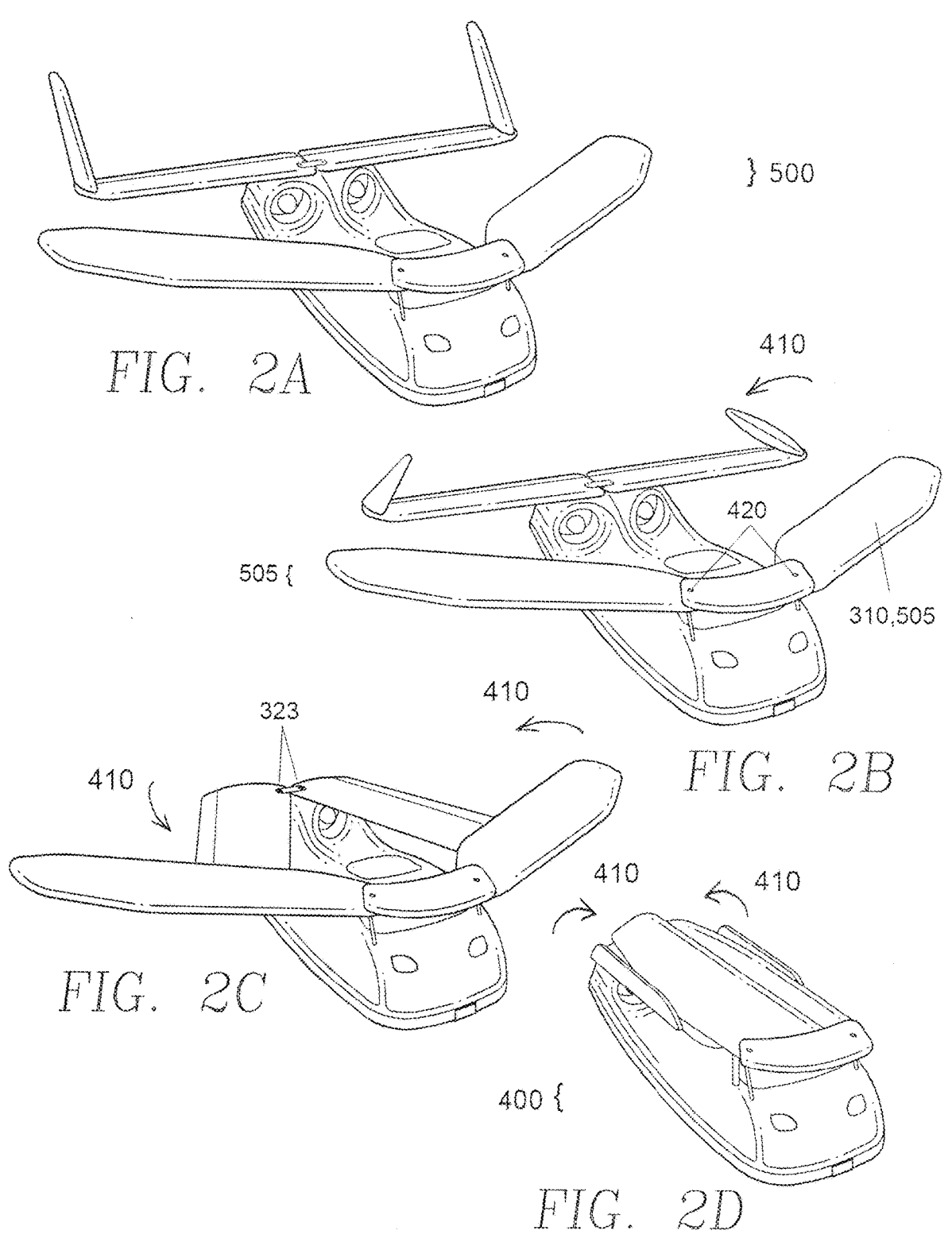
FIG. 2A is a front perspective view of the present invention showing step one of a four step folding sequence going from flying configuration 500 to roadable configuration 400.
FIG. 2B is a front perspective view of the present invention showing step two of a four step folding sequence going from flying configuration 500 to roadable configuration 400.
FIG. 2C is a front perspective view of the present invention showing step three of a four step folding sequence going from flying configuration 500 to roadable configuration 400.
FIG. 2D is a front perspective view of the present invention showing step four of a four step folding sequence going from flying configuration 500 to roadable configuration 400.
Figure 3:
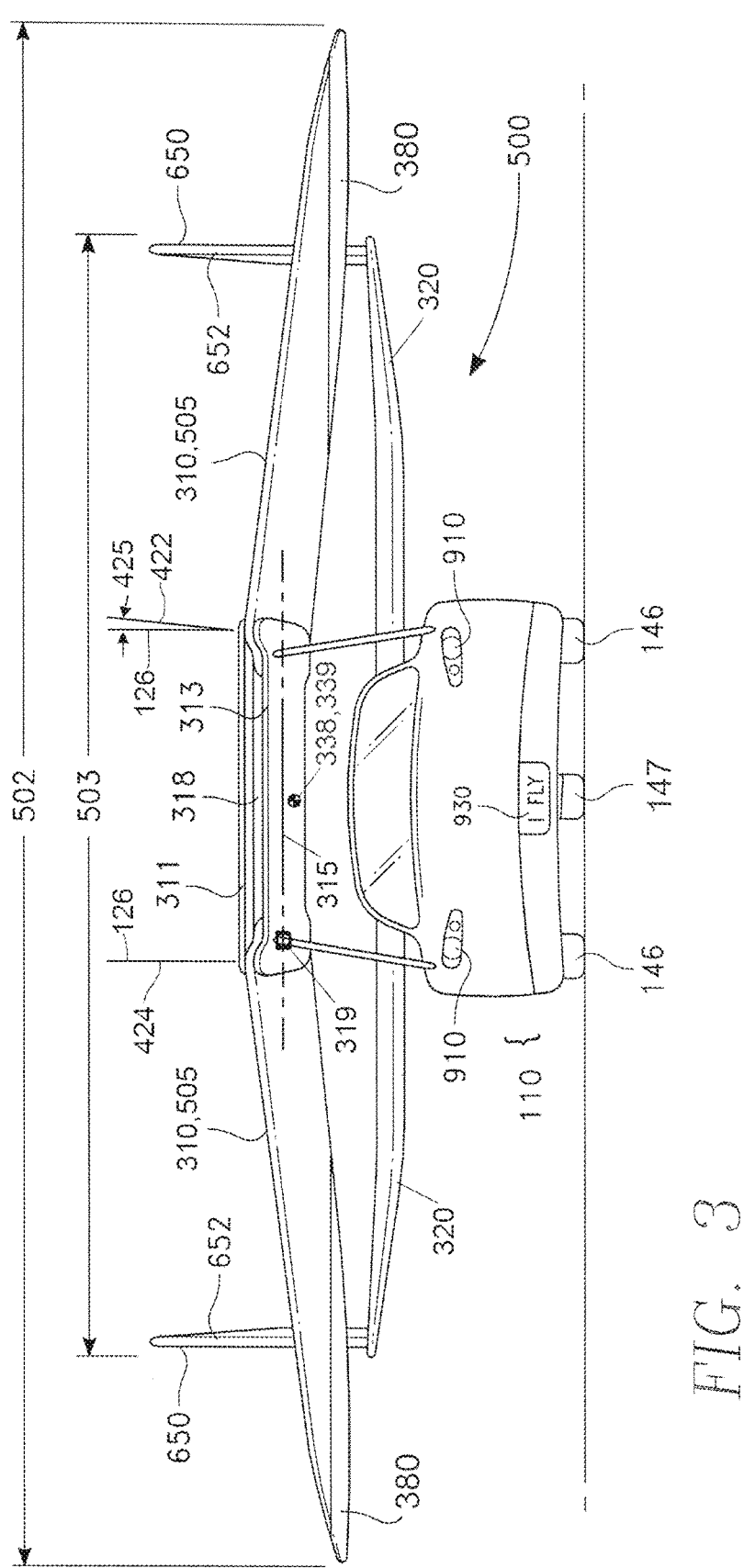
FIG. 3 shows a front view of the flying configuration 500 of the present invention while the craft is resting on the ground.
Figure 4:
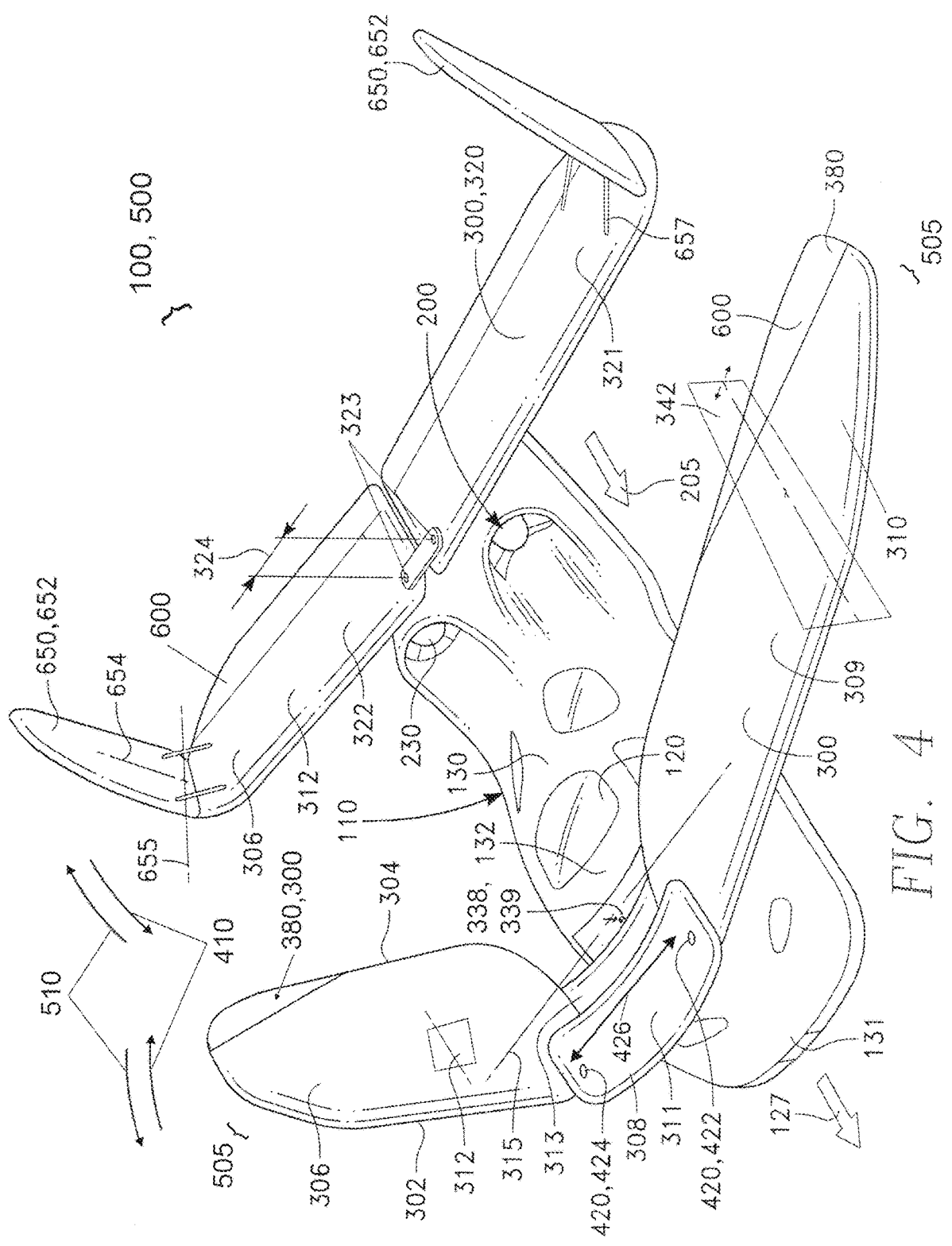
FIG. 4 shows a perspective view of the present invention while resting on the ground in the flying configuration.
Figure 5:
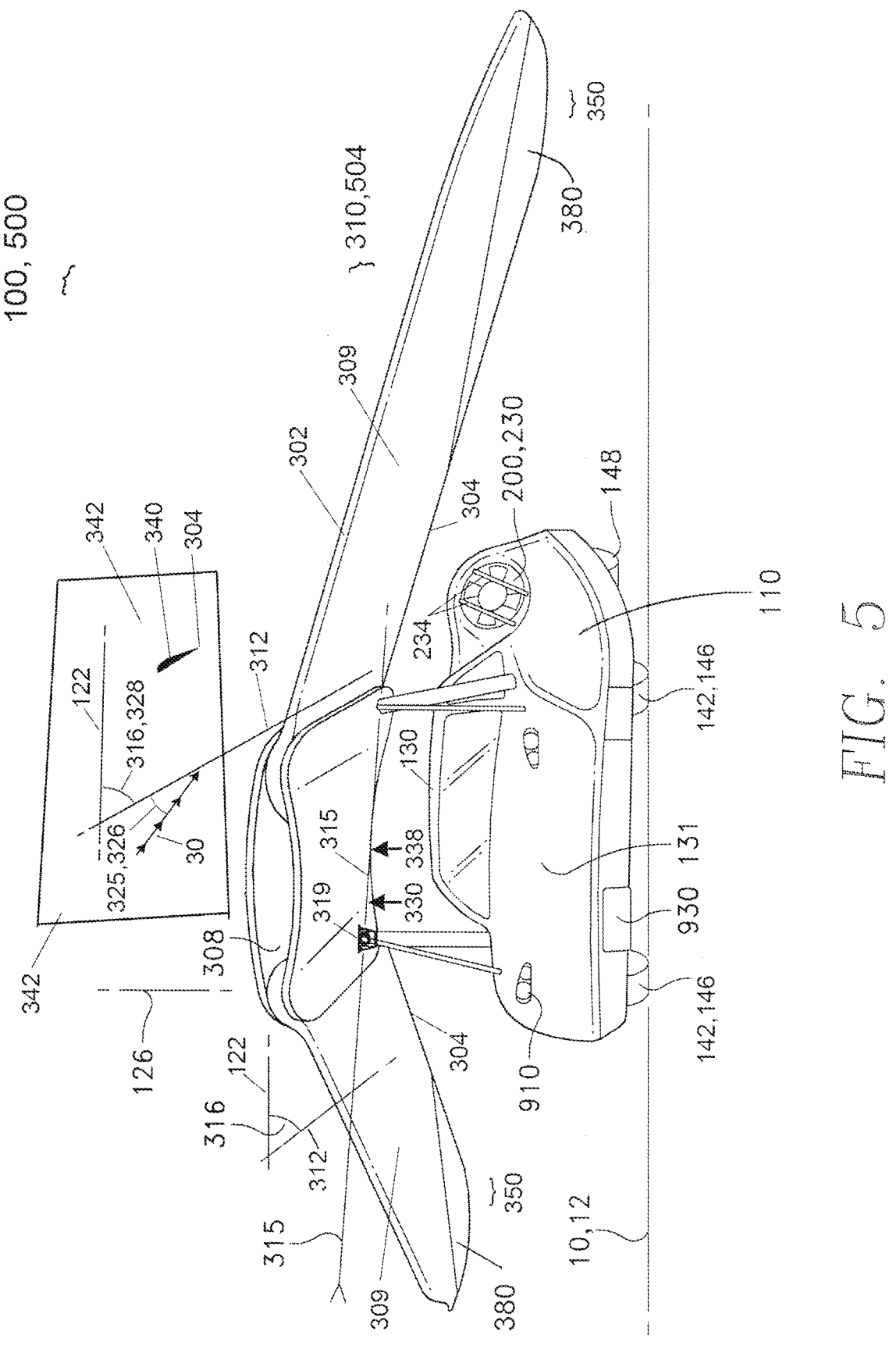
FIG. 5 shows a front perspective view of the flying car with the front lifting surface in a position of large positive angle of incidence; for clarity, the rear wing is not shown in this figure.
Figures 6, 7:
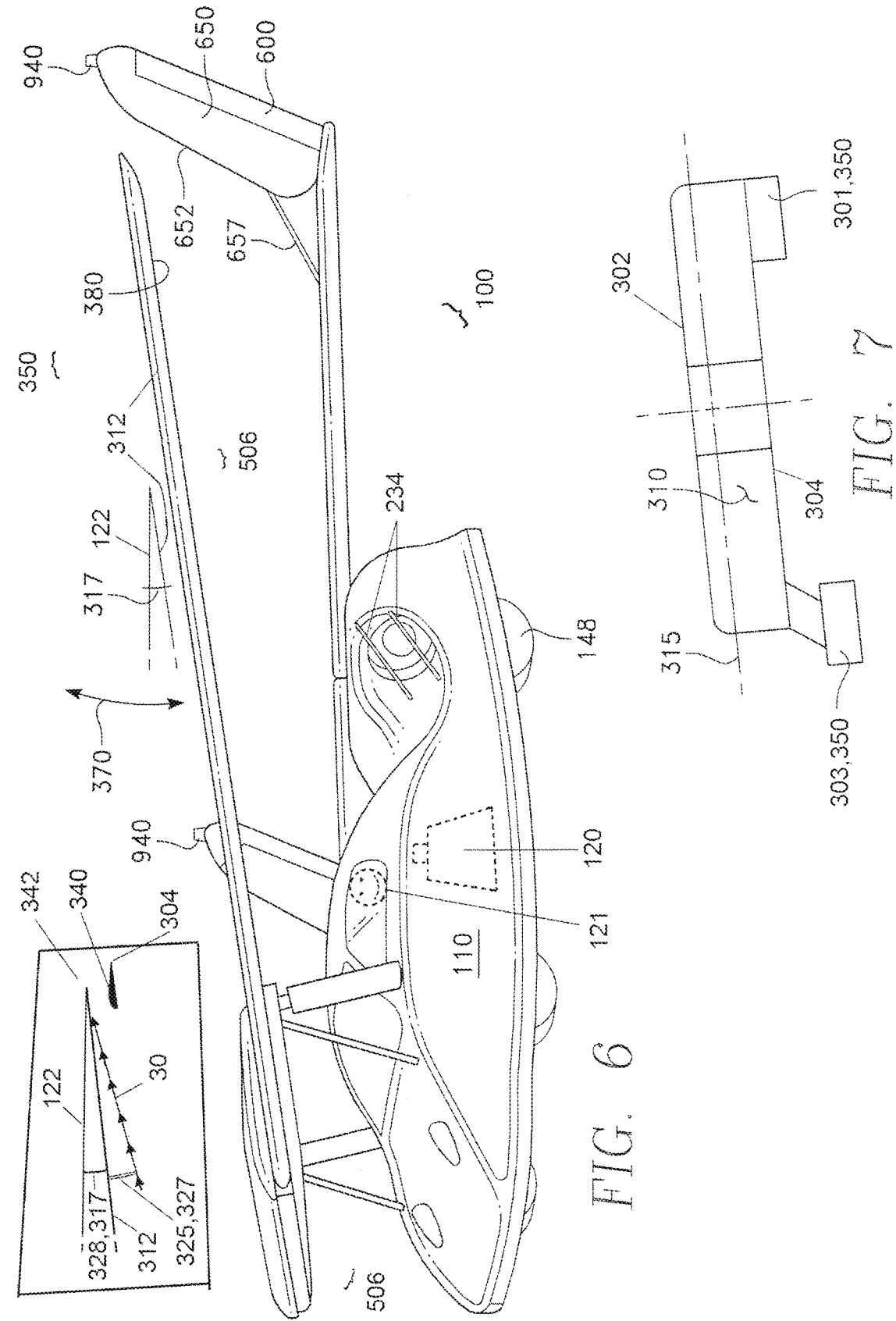
FIG. 6 shows a front perspective view of the flying car with the front lifting surface in a position of negative angle of incidence.
FIG. 7 shows a top view of an alternative front lifting surface with no sweepback and examples of contiguous as well as non-contiguous moveable portions for trim adjustment.

Turning to the drawings, the preferred embodiment is illustrated and described by reference characters that denote similar elements throughout the several views of the instant invention.

The present invention is a flying car 100 type of vehicle 101 and a method of travel using a convertible vehicle 101, which can comprise the following elements.

The flying car 100 can have a body 110, which can be capable of carrying a useful load 120, the vehicle 101 can have a longitudinal axis 122 front to back, a lateral axis 124 side to side, and a vertical axis 126 up and down; the body 110 can have a front portion 131, a middle portion 132 and an aft portion 133.

The present invention can have a plurality of wheels 140 attached to the body 110, and at least one steerable wheel 142 that is capable of providing a steering function for the vehicle 101; the wheels 140 can be of sufficient strength to provide support for the flying car 100 when it is rolling on the ground 10.

The flying car 100 of the present invention can have propulsion means 200, which can be capable of providing a forward force 205 to the vehicle 101 when the flying car 100 is in the air 20; the propulsion means 200 can be able to provide forward force to the car when the car is rolling on the ground 10.

The flying car 100 of the present invention can have a plurality of aerodynamic lifting surfaces 300, a front lifting surface 310 can be located near the front portion 131 of the body 110 and a rear lifting surface 320 can be located proximal to the aft portion 133 of the vehicle 101 body 110; each lifting surface 300 can have: a leading edge 302, a trailing edge 304, at least one tip section 306 outboard from the car body 110, a central section 308 proximal to the car body 110 and a general plane 312 coincident with the averaged contours of the lifting surface 300. When in motion relative to the air, each lifting surface 300 can have an angle of attack 325 and a center of lift 330; the center of lift 330 generally moving fore and aft as the angle of attack 325 that the airflow meets the lifting surface 300 changes; each lifting surface 300 can have airfoil sections 340 taken on planes 342 perpendicular to the general plane 312 of the lifting surface and parallel to the longitudinal axis 122 of the flying car 100. Each lifting surface can have an incidence angle 327 measured between the general plane 312 of the lifting surface 300 and the longitudinal axis 122 of the vehicle 101.

The flying car 100 of the present invention can have airflow detection means 350 for detecting the direction of airflow relative to the front lifting surface 310.

The flying car 100 of the present invention can have inclination means 370 that can adjust the incidence angle 328 of at least a portion of the front lifting surface 310 in response to the airflow detection means 350.

The flying car 100 of the present invention can have a roadable configuration 400 comprising folding means 410 for folding the lifting surfaces 300 so that the roadable configuration 400 is compact enough to function as a road vehicle 402.

The flying car 100 of the present invention can have a flying configuration 500 comprising extending means 510 for extending the lifting surfaces 300 so that the flying configuration 500 is wide enough to provide adequate wingspan for efficient flight.

The flying car 100 of the present invention can have controlling means 600 for steering and directing the up and down motion of the flying car 100 when it is flying through the air 20.

The flying car 100 of the present invention can have directional stability means 650 for keeping the flying car 100 pointed in the general direction that it is going relative to the surrounding air 20 when flying in the flying configuration 500.

The flying car 100 of the present invention can have energy storage means 700 for containing stored energy aboard the flying car 100.

The flying car 100 of the present invention can have energy conversion means 750 for converting the stored energy into mechanical power.

The flying car 100 of the present invention can have transmission means 800 for conveying the mechanical power to the propulsion means 200.

The flying car 100 of the present invention permits a useful load 120 to be carried both on the ground 10 through the road system 12 and also carried in flight through the air 20.

The flying car 100 of the present invention can carry a useful load 120 comprising at least one person 121, whereby a person 121 may enjoy the benefits of both ground 10 and air 20 transportation and rapidly switch between the two.

The flying car 100 of the present invention can comprise four wheels 140 attached to the body 110, two front wheels 146 and two rear wheels 148, the two front wheels 146 can be steerable 142, whereby the flying car 100 can have the roadworthiness of a normal automobile.

The flying car 100 of the present invention can have propulsion means 200 comprising at least one driven wheel 145, 147, whereby ground 10 mobility may be achieved with quiet efficiency.

The flying car 100 of the present invention can have propulsion means 200 comprising at least one ducted fan 230, whereby people and objects are protected from dangerous spinning mechanism.

The flying car 100 of the present invention can have a ducted fan 230 located near the rear 133 of the vehicle 101, whereby superior aerodynamic efficiency can be attained. The flying car 100 of the present invention can have two side-by-side ducted fans 230, whereby the car can be lower and wider and counterrotation of the fans can eliminate many asymmetrical forces on the vehicle 101.

The flying car 100 of the present invention can have airflow detection means 350 and the inclination adjustment means 370 provided by a pivoting of the front lifting surface 310 about a lateral pivot axis 315 in response to the airflow 30, the lateral pivot axis 315 can be located at the center of lift 330 of the front lifting surface 310 when the front lifting surface 310 is operating at a predetermined angle of attack 325. The front lifting surface 310 can have independent pitch stability when pivoted about its lateral pivot axis 315 thereby seeking the predetermined angle of attack 325 as a trim position 316. The front lifting surface 310 can thereby stably fly itself in the manner of a stable independent aircraft with its center of gravity 338 located coincident with the lateral axis pivot position 315. The flying car 100 of the present invention can have an adjustable portion 380 of the front lifting surface 310 that can be adjusted to change the relationship between the location of the lifting surface's center of lift 330 and its angle of attack 325. By means of this adjustable portion 380 the front lifting surface 310 can be made to seek different angles of attack 325 and different trim positions 316, 317. The front lifting surface 310 can be trimmed to fly at a variety of angles of attack 325 and at a variety of lift coefficients by means of the adjustable portion 380, providing pitch and speed control for the flying car 100 when it is flying.

The flying car 100 of the present invention can have the front lifting surface 310 sweep back on both sides from its central section 308. The adjustable portion 380 of the front lifting surface 310 can be selected from a group containing: moveable tip sections and moveable trailing edge 304 portions located proximal to the tip sections and moveable trailing edge 304 portions located proximal to the central section 308 of the front lifting surface 310, providing a variety of ways to change the trim angle of attack 325 of the front lifting surface 310.

The flying car 100 of the present invention can have a front lifting surface 310 that is approximately unswept. A stable relationship between angle of attack 325 and center of lift 330 can be attained by means of reflexed airfoil sections 340 that have an upward bend near their trailing edges 304, whereby no sweep is needed and the lift distribution along the surface can remain more uniform from side to side.

The flying car 100 of the present invention can have the adjustable portions 380 of the front lifting surface 310 comprise attached sub-surfaces non-contiguously located behind the main portion of the front lifting surface 310, whereby sweepback of the surface 310 may not be required. The flying car 100 of the present invention can have the center of mass 338 of the front lifting surface 310 located approximately coincident with (or forward of) its lateral pivot axis 315, whereby the dynamic stability of the surface 310 is enhanced.

When on the ground in flying configuration, a pendulum stability can be achieved for the front lifting surface 310 if, when in level trim position 319, the center of mass 338 of the front lifting surface 310 is predeterminedly located below the location of the lateral pivot axis 315. This center of mass is denoted 339 shown in this position. This pendulum stability causes the front lifting surface 310 to adopt a horizontal trim attitude (level trim position 319) in the absence of any aerodynamic forces. When in flight the first trim position 316 of the front lifting surface 310 can be regulated by the airflow 30 and resulting aerodynamic forces, regardless of the precise vertical position of the center of mass 338 relative to the lateral pivot axis 315. In normal flight the front lifting surface 310 will tend to maintain a level trim attitude (level trim position 319) when the relative wind is coming from the frontal direction 127. If the relative wind comes from behind, as when taxiing with a strong tailwind, the reverse airflow 30 over the front lifting surface 310 can blow the front lifting surface 310 out of level trim position 319, pitching the front lifting surface 310 to an extreme nose up or nose down attitude. Free motion of the front lifting surface 310 is essential when in flight to maintain pitch stability with the centrally located weight distribution afforded by the present flying vehicle configuration.

A lateral pivot front surface actuator 319 can be used for stabilizing the front lifting surface 310 when taxiing the vehicle 101 in the flying configuration and encountering a tail wind. Other uses of a lateral pivot front surface actuator 319 can include limiting the motion of the front lifting surface with a soft stop action as the front lifting surface 319 reaches the limits of its lateral pivot axis 315 travel. The lateral pivot front surface actuator 319 can be used to position the front lifting surface 310 at proper incidence for folding into the roadable configuration 400 of the vehicle 101.

A lateral pivot front surface actuator 319 can be situated in multiple locations on the lateral pivot axis 315. The various figures show a single actuator located on the starboard pivot point of the front lifting surface 310.

The flying car 100 of the present invention can have a first portion of its front lifting surface 310 fixed in incidence relative to the longitudinal axis 122 and a second portion of the front lifting surface that can move in response to the airflow detection means 350, whereby the moving parts of the surface 310 may be smaller.

The flying car 100 of the present invention can have a mechanical torque about the lateral pivot axis 315 applied to the front lifting surface 310 by the lateral pivot front surface actuator 319 without significantly interfering with the lifting surface's ability to respond to the airflow detection means 350, the torque can be applied for a purpose selected from among the group consisting of: adjusting the trim angle of the surface and providing damping to the surface while it is pivoting.

The flying car 100 of the present invention can have the front lifting surface 310 comprise a central element 308, with two substantially vertical pivot axes 420 located on the central element 308, a forward port side element with a pivot location 422 and a forward starboard side element with a pivot location 424. Each forward side element can be able to pivot rearwards about one of the two pivot axes positioned on the central element, the two pivot axes can be separated by a first lateral spacing 426 small enough to permit the forward side elements 309 to fold back into a roadable configuration 400 that meets predetermined width restrictions, the first lateral spacing 426 can be large enough to allow the two forward side elements 309 to fold back into a roadable configuration 400 without interference between the two forward side elements 309.

The front lifting surface 310 of flying car 100 of the present invention can have at least one of the two folding pivot axes 420 inclined from the vertical by a predetermined amount, such that due to the fore and aft inclination of the pivot axis 420, as each side element 309 rotates rearward about the vertical axis 126 of the vehicle 101, at least one forward side element 309 also rotates about the longitudinal axis 122 such that the trailing edges 304 of the two forward side elements 309 are vertically displaced relative to each other in the roadable configuration 400. This allows the trailing edges 304 of the two front lifting surface side elements 309 to overlap along the centerline of the vehicle 101; and still the two forward side elements 309 of the front lifting surface 310 can have good lateral symmetry in the extended flying configuration 500, whereby a more compact roadable configuration 400 results than if no overlap is provided and a visually pleasing lateral symmetry is maintained when the surfaces 300, 309 are extended in flying configuration 500.

The flying car 100 of the present invention can have the central element 308 of the front lifting surface 310 comprise an upper part 311 and a lower part 313, the upper part 311 and the lower part 313 each can have an aerodynamically streamlined airfoil section. The upper part 311 and the lower part 313 can be separated by a predetermined distance 318 allowing the central sections of the two forward side elements 309 of the front lifting surface 310 to fit between the upper part 311 and the lower part 313 of the central element 308 when the front lifting surface 310 is folded into its roadable configuration 400. With this arrangement, aerodynamic streamlining is enhanced in the flying configuration 500, with a minimum of moving parts.

The flying car 100 of the present invention can have the front lifting surface 310 provided with means of maintaining a substantially horizontal orientation when the vehicle 101 is on the ground in the flying configuration 500 and a wind is blowing from behind the vehicle 101, whereby the front lifting surface 310 is prevented from flopping around and being damaged in adverse wind conditions. A centering spring can be used to achieve this function, while still allowing the front lifting surface 310 to respond to the angle or airflow 30 in normal flight. The lateral pivot front surface actuator 319 can provide this function. The lateral pivot front surface actuator 319 can function in some distinct modes of operation. In normal flight the actuator 319 can allow complete free motion of the front lifting surface 310 about the lateral pivot axis 315. In extreme flight maneuvers, such as whip stalls, tail slides or tumbling the front lifting surface 310 may reach the limits of its pivot travel, it this condition the actuator 319 can provide a soft stop function for the front lifting surface 319 as it comes to the limits of its pivoting travel, thus preventing damage to the support structures. Both damping and spring function can be incorporated to soften the stop. In an alternative embodiment the lifting surface can rotate 360 degrees around without stops, but this requires a different arrangement of the surface center section and makes running wires across the pivot rather difficult.

In flight the lateral pivot front surface actuator 319 can provide alternative trim control of the front lifting surface 310 in alternative to moving the adjustable portions 380 of the surface 310.

A second mode of action for the actuator 319 to address is tailwind taxiing where the front surface may tend to blow out of level until it reaches its stops.

A third mode is when folding the wings to form a roadable configuration 400. As the front wings fold backward the balance point of the front lifting surface 310 changes and the surface wants to pitch nose up. A brace 314 can be used to restrain this pitch up, but any restraint must be reliably removed prior to flight or a dangerous unstable situation may result. Removal of the brace 314 restraint function can be achieved by moving the upper end 414 of the brace 314 rearward to coincide with the lateral pivot axis 315, when going into flight configuration.

In the wing-folding mode, a brace 314 as shown would be placed in tension as the front lifting surface 310 folds rearward to form the roadable configuration 400 of the vehicle 101, therefore for this function, the brace 314 could be a tension-only carrying element, like a line or cord.

The lateral pivot front surface actuator 319 can comprise a direct drive high torque electric motor that operates over a sector of arc.

The lateral pivot front surface actuator 319 can comprise a rotary pneumatic sector motor somewhat similar to that found moving the windshield wipers of mid twentieth century automobiles.

The brace 314 can be provided with a telescoping joint 416 that allows the brace 314 to change length in response to axial load or position or rate of change of length. With a telescoping joint 416 the brace 314 can duplicate the action of a lateral pivot front surface actuator 319, providing soft end stops, anti-flutter damping and taxi tailwind stability.

The flying car 100 of the present invention can have the rear lifting surface 320 comprise a rear port side element 321 and a rear starboard side element 322. Two rear folding pivot locations 323 can be provided on the aft portion of the car body 110, a second predetermined spacing 324 can separate the two rear pivot locations 323; the second spacing 324 can be sufficiently large to allow the two rear side lifting surface elements 321, 322 to pivot and fold forward and not interfere with each other in the roadable configuration 400.

The flying car 100 of the present invention, when going from the flying configuration 500 to the roadable configuration 400, can have the front lifting surface 310 fold rearward and the rear lifting surface 320 fold forward. The front lifting surface 310 can be above the rear lifting surface 320 when in the roadable configuration 400, in this way the wingspan 502 of the front lifting surface 310 can be greater that the wingspan 503 of the rear lifting surface 320.

The flying car 100 of the present invention can have the directional stability means 650 for the flying configuration 500 comprise a pair of substantially vertical aerodynamic stabilizer surfaces 652 located proximal to the tip sections 306 of the two rear side elements 321, 322 of the rear lifting surface 320. The substantially vertical aerodynamic surfaces 652 can fold to a position proximal to the rear lifting surface 320 side elements 321, 322 when forming a roadable configuration 400, whereby the stabilizer surfaces 652 can be folded and stowed between the front lifting surface 310 and the rear lifting surface 320 when in the roadable configuration 400.

The flying car 100 of the present invention can have the substantially vertical aerodynamic stabilizer surfaces 652 swept back from their attachment points proximal to the tip sections 306 of their respective rear side lifting surface elements 321, 322. The stabilizer surfaces 852 can fold inwards toward the central section of the rear lifting surface 320; the folding action of each stabilizer surface 652 can be accomplished by means of rotation about two different pivot axes, a first axis 654 can be approximately in the plane of the stabilizer surface, and a second pivot axis 655 can be approximately in the plane of the rear lifting surface 320. Means of securing the stabilizer surface 652 in a predetermined orientation can be provided when in the flying configuration 500. With this arrangement, a swept back stabilizer surface 652 may be folded proximal to a lifting surface 300 without overhanging the trailing edge 304 of the lifting surface 300, this results in a more compact roadable configuration 400.

The flying car 100 of the present invention can have the energy storage means 700 comprise an element selected from the group consisting of: a fuel tank with fuel, and a battery module, and a super capacitor bank.

The flying car 100 of the present invention can have the energy conversion means 750 selected from among the group consisting of: an internal combustion engine, and a gas turbine, and an electric motor.

The flying car 100 of the present invention can have the transmission means 800 comprise an element selected from the group consisting of: a clutch, and a drive shaft, and a gear train, and a Vee belt drive system, and a cog belt system, and an electrical generator, and an electric motor.

The flying car 100 of the present invention can further comprise an autopilot system, the autopilot system can be able to control and navigate the flying car 100 in accordance with programmed instructions.

The flying car 100 of the present invention can further comprise water ballast tanks 820, the water ballast tanks 820 when filled, can provide additional mass for the flying car 100. The additional mass can give additional stability to the roadable configuration 400 in windy conditions.

The flying car 100 of the present invention can have the water ballast tanks 820, when filled, provide additional crash protection for a person 121 located within the body 110 of the flying car 100. The water ballast tanks 820 can provide a structural side beam function in the doors and side panels of the vehicle 101.

The present invention provides a method of traveling both on the ground 10 through a road system 12 and through the air 20 in a single vehicle 101.

The method of the present invention can comprise driving a vehicle 101 with folded wings on a road 12, the vehicle 101 can have a plurality of wheels 140 and means of steering. The vehicle 101 can have a side-to-side lateral axis 124 and a frontal direction 127.

The method of the present invention can comprise unfolding the lifting surfaces 300 (wings) of the vehicle 101 to form a flying configuration 500.

The method of the present invention can comprise allowing a front lifting surface 310 (front wing) of the vehicle 101 to pivot about a substantially lateral axis 315 in response to surrounding airflow 30; the front lifting surface 310 can have independent aerodynamic stability about the substantially lateral trim pivot axis 315. The front lifting surface 310 can seek a predetermined angle of attack 325, 326, 327 relative to oncoming airflow 30 from the frontal direction 127 of the vehicle 101.

The method of the present invention can comprise controlling the predetermined angle of attack 325, 326, 327 of the front lifting surface (front wing) for navigational purposes.

The method of the present invention can comprise providing aerodynamic thrust 205 to the vehicle 101.

The method of the present invention can comprise flying the vehicle 101 through the air 20.

The method of the present invention can comprise folding the vehicle's 101 lifting surfaces 300 (wings) to produce a roadable configuration 400.

The flying vehicle 101 of the present invention can comprise: a body 110, said body being capable of carrying a useful load 120, said vehicle 101 having a longitudinal axis 122 front to back, a lateral axis 124 side to side, and a vertical axis 126 up and down; said body 110 having a front portion 131, a middle portion 132 and an aft portion 133.

The vehicle 101 of the present invention can have an independently drivable portion 135 with not more than three wheels, so that the independently drivable portion 135 can be licensed for road use as a three wheeled motorcycle or a cyclecar.

The vehicle 101 can have a second portion 137 comprising at least one wheel 140, said second portion 137 being detachably attachable to said independently drivable portion 135 when said vehicle 101 is in said roadable configuration 400, whereby said second portion 137 can provide additional road stability to said vehicle 101 and said vehicle 101 may be licensed in its roadable configuration 400 as a three wheeled motorcycle (element 135) with a trailer (element 137).

With this configuration, a useful load 120 may be carried both on the ground 10 through the road system 12 and also carried in flight through the air 20 in a stable roadable vehicle 101 with fewer requirements than must be met by a standard four-wheeled automobile configuration.

The second portion 137 can comprise two wheels 140, 148 located approximately laterally from a central rear wheel 147 of said independently drivable portion 135, whereby the independently drivable portion 135 is stabilized in roll by the second detachable portion 137 and the vehicle 101 may rotate to a take off attitude while the central wheel 147 and the two side wheels 148 of the second detachable portion 137 all remain in contact with the ground 10.

This Safety Wheel Trailer arrangement provides roll stability similar to training wheels on a bike.

The central rear wheel 147 of said independently drivable portion 135 can be the driven wheel for the roadable configuration 400 of the vehicle 101, whereby no differential function is needed as is needed with dual drive wheels.

A hitch assembly 138 can attach the detachable portion 137 to the independently drivable portion 135. The hitch assembly 138 can comprise multiple points of attachment to the independently drivable portion 135. The hitch assembly 138 can comprise at least one safety chain 139 as is frequently required. When the two portions of the vehicle 101, 102 are attached by the hitch assembly 318, the side rear wheels 148 of the detachable portion 137 can be constrained in lateral motion and constrained in fore and aft motion, but have predetermined suspension travel in the vertical direction. This suspension travel can incorporate anti-sway features to reduce vehicle 101 body 110 rolling in hard turns. Providing roll stability to the rear end 133 of the vehicle 101 is a key function of the joined detachable portion 137.

An active wheel is in contact with the ground. A spare wheel is an inactive wheel. An outrigger wheel, for emergencies, that is not in normal contact with the ground can be considered an inactive wheel.

A composite vehicle system 102 is formed when the independently drivable portion 136 is attached to the detachably joined portion 137 by the hitch assembly 138

The flying car vehicle 101, 102 can have the detachably joined portion 137 licensed as a trailer.

The flying car vehicle 101, 102 can have the detachably joined portion 137 display a trailer license plate 932 attached to the detachably joined portion 137.

The flying car vehicle 101, 102 can have the independently drivable portion 136 display a motorcycle license plate 931 attached to the independently drivable portion 136.

A three wheeled motorcycle will not generally require a front license plate 130.

The flying car vehicle 101 can have an autopilot system that is adapted to delivering cargo without a human pilot on board when operating in the flying configuration 500 and then a human driver rides with the vehicle 101 in the roadable configuration 400, said driver can assist in activities selected from a list that includes: cargo delivery, and complex driving tasks, and human interactions such as sales.

The invention illustratively disclosed herein suitably may be practiced in the absence of any element which is not specifically disclosed herein.

The discussion included in this detailed description is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A vehicle convertible between a roadable configuration and a flyable configuration comprising:

an independently drivable portion, said independently drivable portion having a lateral axis, a vertical axis and a longitudinal axis, an enclosed top and sides and a bottom with a detachably joined portion attached to said bottom, said independently drivable portion having no more than three active wheels and said detachably joined section having at least one active wheel, said no more than three active wheels being capable of being in rolling contact with the ground when in said roadable configuration, a front set of lifting surfaces attached to said enclosed top that are extendible to create a flyable configuration;

a rear set of lifting surfaces attached to said enclosed top that are extendible to create a flyable configuration wherein said front and rear sets of lifting surfaces are folded inward toward each other and resting on said enclosed top of said independently drivable portion when said vehicle is in said roadable configuration and wherein said front and rear sets of lifting surfaces are extended outward and away from each other while attached to said enclosed top of said independently drivable portion when said vehicle is in said flyable configuration.

2. The vehicle of claim 1, wherein said independently drivable portion is licensed as a type of vehicle taken from the group including: three-wheeled motorcycle, and cyclecar.

3. The vehicle of claim 2, wherein said detachably joined section has at least two rear side wheels and wherein a hitch assembly joins said detachably joined portion of said vehicle to said independently drivable portion of said vehicle.

4. The vehicle of claim 3, additionally comprising at least one safety chain going between said detachably joined portion and said independently drivable portion.

5. The vehicle of claim 1, wherein said detachably joined portion is utilized as a trailer.

6. The vehicle of claim 5, wherein said detachably joined portion comprises a location to displays a trailer license plate attached to said detachably joined portion.

7. The vehicle of claim 2, wherein said independently drivable portion further comprises a location to display a motorcycle license plate attached to said independently drivable portion.

8. The vehicle of claim 1, wherein said detachably joined portion further comprises two wheels located approximately laterally from a single wheel of said independent drivable portion.

9. The vehicle of claim 8, wherein one of said no more than three active wheels of said independent drivable portion is the driven wheel for said roadable configuration of said vehicle.

10. A method of operating a composite vehicle in both a roadable configuration and also in a flying configuration comprising the steps of:

a) attaching an independently drivable portion of said composite vehicle to a detachable trailer portion said composite vehicle further comprising:

a lateral axis, a vertical axis and a longitudinal axis, an enclosed top and sides and a bottom, said detachable trailer portion being attachable to said bottom, said independently drivable portion having no more than three active wheels and said detachable trailer section having at least one active wheel, said no more than three active wheels being capable of being in rolling contact with the ground when in said roadable configuration;

at least one set of lifting surfaces attached to said enclosed top that are extendible to create a flyable configuration;

wherein said front and rear sets of lifting surfaces are folded inward toward each other and resting on said enclosed top of said independently drivable portion when said vehicle is in said roadable configuration and wherein said front and rear sets of lifting surfaces are extended outward and away from each other while attached to said enclosed top of said independently drivable portion when said vehicle is in said flyable configuration;

b) licensing said independently drivable portion as a type of vehicle taken from the list including: three-wheeled motorcycle, and cyclecar;

c) establishing the legal status of said detachable trailer portion of said vehicle as a trailer;

d) legally operating said composite vehicle in a roadable configuration, by driving said composite vehicle on a road system;

e) converting said composite vehicle to a flying configuration; and f) flying said composite vehicle through the air.

11. The method of claim 10 further comprising the action of carrying cargo.

12. The method of claim 10 wherein said flying of said composite vehicle through the air is accomplished autonomously without the aid of a human pilot.

13. The method of claim 12 wherein the ground operation of said vehicle through the road system is accomplished with the aid of a human driver.

* * * * *